Figure 1:
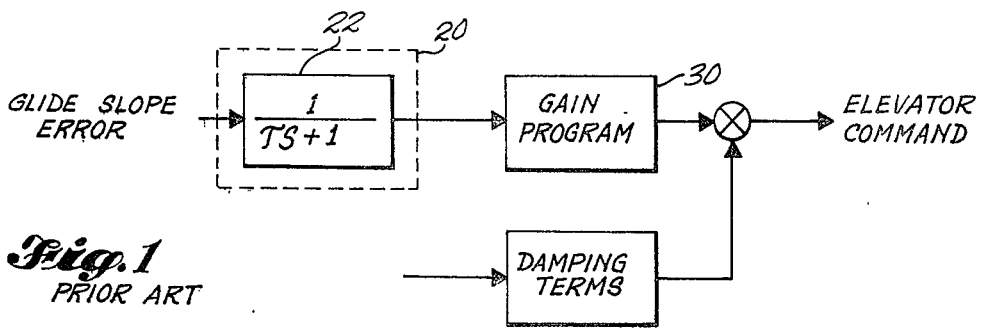

United States Patent [19]
Boone et al.

[11] 3,944,171
[45] Mar. 16, 1976

[54] GLIDE SLOPE CONTROL SIGNAL PROCESSING SYSTEM

[75] Inventors: Jimmie H. Boone; Robert D. Simpson, both of Bellevue, Wash.

[73] Assignee: The Boeing Company, Seattle, Wash.

[22] Filed: Dec. 23, 1974

[21] Appl. No.: 535,388

[52] U.S. Cl. ........... 244/77 A; 235/150.22; 318/583; 343/108 R
[51] Int. Cl.² .......................................... B64C 13/18
[58] Field of Search .............. 73/178 T; 235/150.22; 244/77 A, 77 B; 318/583; 340/27 NA; 343/108 R

[56] References Cited
UNITED STATES PATENTS

| | | | |
|---|---|---|---|
| 3,463,422 | 8/1969 | Watson | 244/77 A |
| 3,773,281 | 11/1973 | Doniger et al. | 244/77 A |
| 3,860,800 | 1/1975 | Simpson | 244/77 A X |

*Primary Examiner*—Trygve M. Blix
*Assistant Examiner*—Stephen G. Kunin
*Attorney, Agent, or Firm*—Conrad O. Gardner; Glenn Orlob

[57] ABSTRACT

A rate-limited, signal magnitude limited, non-linearized lag circuit for processing glide slope error signals to reject noise and reduce aircraft response to hardover signals due to ground transmitter malfunctions or other anomalies. A feature of an embodiment includes a logic circuit connected to the lag circuit for preventing aircraft deviation due to hardover signals.

5 Claims, 3 Drawing Figures

U.S. Patent    March 16, 1976    3,944,171

GLIDE SLOPE CONTROL SIGNAL PROCESSING SYSTEM

This invention relates to glide slope command signal processing system and particularly to a system and method for suppressing beam high frequency noise or hardover signals without affecting normal precision approaches.

Known control systems utilize a simple low pass filter to reduce high frequency noise and have no provision for further slowing or preventing undesired aircraft response to hardover malfunctions.

It is accordingly an object of the present invention to provide glide slope control channel signal processing means for suppressing the effects of noise or hardovers.

It is a further object of the present invention to provide rate limited, command limited lag circuit means for processing signals representative of glide slope error to prevent nuisance warnings due to excessive beam high frequency noise and to further prevent undesired changes in actual aircraft flight path due to ground transmitter malfunctions.

It is another object of the present invention to provide a means for processing signals representative of glide slope error to reject noise signals and reduce aircraft response to hardover malfunctions.

A further feature according to an embodiment of the present invention includes utilization of logic circuit means for preventing aircraft deviation from a specified or desired flight path due to presence in the glide slope control channel of command signal components indicative of hardover malfunctions.

A further feature according to an embodiment of the present invention includes utilization of logic circuit means for preventing aircraft deviation from a specified or desired flight path due to presence in the glide slope control channel of command signal components indicative of hardover malfunctions.

Figure 2:
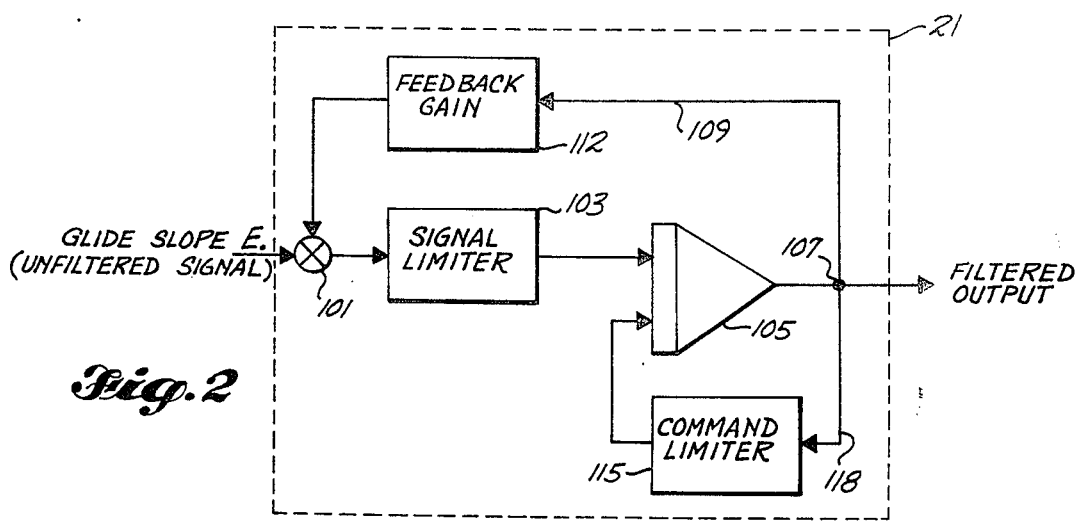
Figure 3:
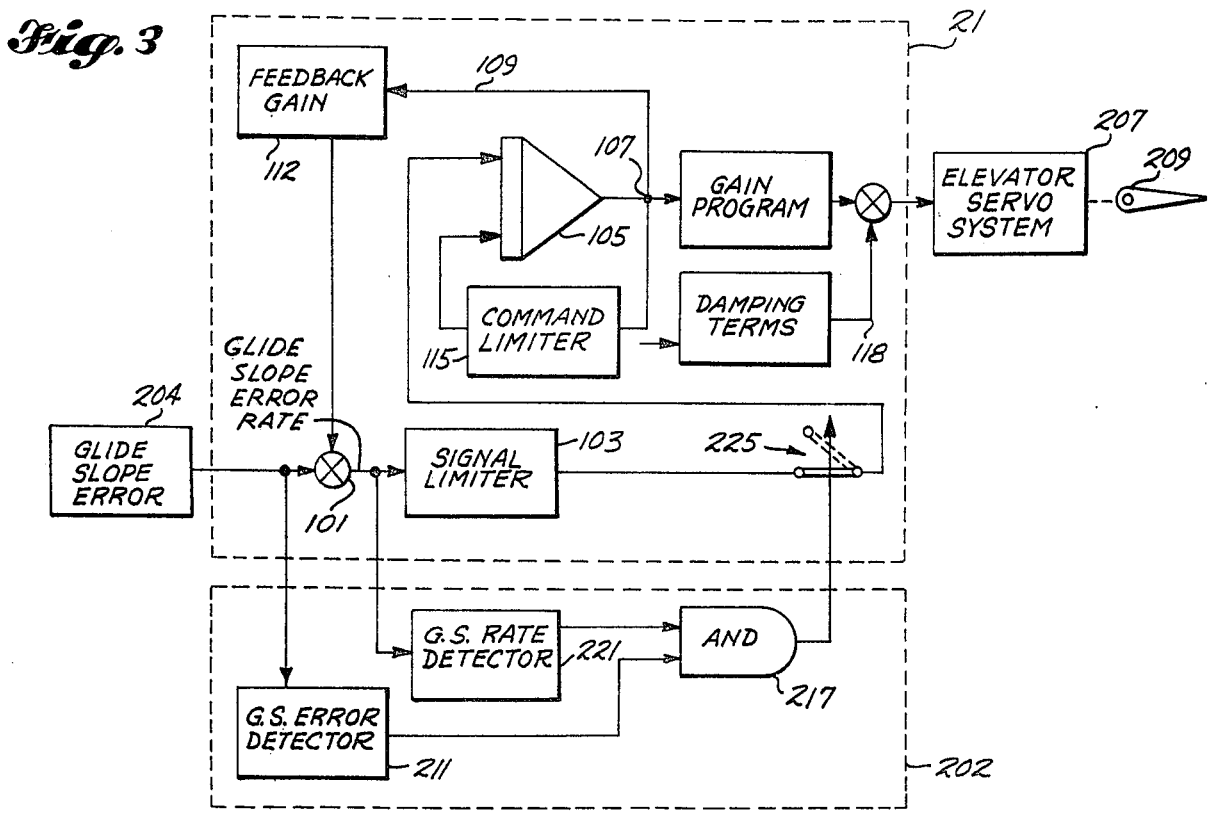

The above and other features and objects of the present invention will become apparent upon a reading of the following description in conjunction with the accompanying drawings in which:

FIG. 1 is a block diagram of glide slope command signal processor showing filtering representative of a prior art technique utilizing a passive type low pass filter;

FIG. 2 is a diagram of the circuits forming the present rate limited, command limited lag circuit for processing unfiltered signals representative of glide slope error which may be substituted for the passive type low pass filter shown in FIG. 1; and, FIG. 3 is a block diagram of an aircraft slope control system for providing glide slope control command signals for driving longitudinal axis control surfaces e.g. the elevators of an aircraft which control system utilizes the rate limited, command limited lag circuit means of FIG. 2 further including logic control.

Turning now very briefly to FIG. 1, which is representative of a prior art approach, it will be noted that glide slope command signal processing means 20 upstream of the gain program circuit means 30 comprises a low pass filter circuit 22. The glide slope command signal processing means 21 shown however in FIG. 2 which may be substituted for means 20 in the prior art system of FIG. 1 includes features hereinbefore mentioned and now discussed in more detail. More specifically, the unfiltered glide slope error signal is coupled to a first input of first summing junction 101, the output of summing junction 101 being coupled to the input of signal limiter circuit 103 which comprises a rate limiting circuit. The output of signal limiter circuit 103 is coupled to a first input of integrator circuit 105, and the output terminal 107 of integrator circuit 105 is coupled back through a first feedback circuit path 109 providing feedback gain 112 to the second input of summing junction 101, while a second feedback circuit path 118 from output terminal 107 of integrator circuit 105 including command limiter 115 is coupled back to the second input of integrator circuit 105 thereby providing amplitude limiting of the command signal at terminal 107. The glide slope command signal processing circuit means 21 of FIG. 2 when substituted for the simple passive filter 22 of FIG. 1 provides a means for suppressing the effects of noise or hardovers by rejecting the noise through the lag circuit means provided by integrator circuit 105 and feedback path 109; or suppressing the effects of hardovers by slowing aircraft response through (1) signal limiter circuit means 103 which permits low pass filtering unless the error signal magnitude or the algebraic summation of glide slope exceeds the error signal and feedback signal limiting value when the filter output rate of change is then limited to a predetermined acceptable maximum value and (2) by means of command limiter 115 through feedback path 118 which as mentioned earlier provides amplitude limiting of the filtered output command signal provided at output terminal 107 of integrator circuit 105.

Turning now to the system shown in FIG. 3, it will be noted that while the circuit of FIG. 2 by means of signal limiter 103 and command limiter 115 tends to reduce aircraft response due to hardovers, the system of FIG. 3 includes logic circuit means 202 connected in circuit with the signal processing circuit 21 to not only release (by circuit 21) but also prevent aircraft response due to hardovers causing glide slope error signals which exceed a desired amplitude AND rate.

In the system of FIG. 3, a glide slope error detector 204 provides the unfiltered signal representative of glide slope error as an input to first input of adder circuit 101 for processing by circuit 21 to provide command signals for controlling longitudinal axis control surfaces, viz. elevator servo system 207 which in turn is connected to drive the elevators 209 in a conventional manner. Logic circuit means 202 includes a glide slope error detector circuit 211 which is coupled to the glide slope error detector circuit 211 and responsive to the signal representative of glide slope error to provide a first logic control output signal when a predetermined glide slope error signal amplitude is exceeded whihc is coupled to a first input of AND circuit 217. Glide slope rate detector circuit 221 has the input thereof coupled to the output terminal of adder circuit 101 to thereby sense glide slope rate velocity error (which is eventually integrated downstream by integrator circuit 105 to provide glide slope command signals) so that when a predetermined rate is exceeded, a second logic control output signal is coupled to a second input of AND circuit 217. The presence of the first and second logic control output signals as inputs to AND circuit 217 causes the presence of an AND circuit output signal which opens normally closed switching means 225 thereby opening the circuit path between signal limiter circuit 103 and integrator circuit 105 and thus clamping integrator 105 and causing the integrator output glide slope command signal level to remain constant. It be seen that logic circuit 202 provides means [for main]taining a constant glide slope command signal [when the] signal representative of glide slope error exceeds [a] predetermined amplitude level and the signal [represen]tative of glide slope error rate of change exceeds a predetermind value and therefore further deviates the aircraft from the constant glide.

[What] is claimed is:

[1. A c]ombination in a pitch axis control system for an [aircraft] having longitudinal axis control surfaces:

[means] for generating a signal representative of glide [slope] error; means including a servo system con[nect]ed to drive said longitudinal axis control sur[faces]; rate limited lag circuit means including an [integ]rator circuit coupled between said means for [gene]rating a signal representative of glide slope [error] and said means including a servo system con[nect]ed to drive said longitudinal axis control sur[faces]; and, logic circuit means connected in circuit [betw]een said means for generating a signal repre[senta]tive of glide slope error and said rate limited [lag c]ircuit means for controlling the output of said [integ]rator circuit.

[2. In a] glide slope control system for an aircraft, a [system fo]r processing signals representative of glide [slope err]or comprising:

[adder] circuit means having a first input terminal [adap]ted for coupling signals to representative of [glide] slope error, a second input terminal, and an [outpu]t terminal; signal limiter circuit means; inte[grato]r circuit means having first and second input [termi]nals and an output terminal; said signal limiter [circu]it means coupled in circuit path between said [outpu]t terminal of said adder circuit means and [said f]irst input terminal of said integrator circuit [means]; feedback circuit means connected to pro[vide f]eedback gain between said output terminal of [said i]ntegrator circuit means and said second input [termi]nal of said adder circuit means; and, further [feedb]ack circuit means connected between said [outpu]t terminal of said integrator circuit means [and s]aid second input terminal of said integrator circuit means for providing command signal limiting.

3. The invention according to claim 2 further including logic circuit means for interrupting said circuit path between said limiter circuit means and said first input terminal of said integrator circuit means when the glide slope error rate and glide slope error signal amplitudes exceed predetermined values.

4. The invention according to claim 3 wherein said logic circuit means comprises:

switching means disposed in said circuit path between said limiter circuit means and said first input terminal of said integrator circuit means; AND circuit means having first and second input terminals, and an output terminal connected to actuate said switching means when said AND circuit logic is satisfied; glide slope error detector circuit means coupled between said first input terminal of said adder circuit means and said second input terminal of said AND circuit means; and, glide slope error rate detector circuit means coupled between the output terminal of said adder circuit means and said first input terminal of said AND circuit means.

5. In combination in a glide slope control system for providing glide slope command signals in an aircraft having first means for providing signals representative of glide slope error, and second means for providing signals representative of glide slope error rate:

glide slope error detector circuit means responsive to said signals representative of glide slope error for providing a first logic control output signal when said signal representative of glide slope error exceeds a predetermined amplitude level;

glide slope error rate detector circuit means responsive to said signals representative of glide slope error rate for providing a second logic control output signal when said signal representative of glide slope rate exceeds a predetermined rate; and AND circuit means responsive to said first and second logic control output signals for maintaining a constant amplitude glide slope command signal.

* * * * *